United States Patent [19]

Morris

[11] Patent Number: 4,960,146
[45] Date of Patent: Oct. 2, 1990

[54] EARTHQUAKE SAFETY VALVE

[76] Inventor: Antone W. Morris, P.O. Box 208, Point Reyes, Calif. 94956

[21] Appl. No.: 514,762

[22] Filed: Apr. 26, 1990

[51] Int. Cl.⁵ .............................................. F16K 17/36
[52] U.S. Cl. ..................................... 137/39; 137/460; 251/65
[58] Field of Search ..................... 137/38, 39, 460; 251/65

[56] References Cited

U.S. PATENT DOCUMENTS

| | | | |
|---|---|---|---|
| 3,783,887 | 1/1974 | Shoji | 137/38 |
| 4,640,303 | 2/1987 | Greenberg | 137/38 |
| 4,785,842 | 11/1988 | Johnson | 137/38 |
| 4,799,505 | 1/1989 | Nowell | 137/38 |
| 4,883,081 | 11/1989 | Morris | 137/39 |

FOREIGN PATENT DOCUMENTS 163778 10/1982 Japan ..................................... 137/38

Primary Examiner—Robert G. Nilson
Attorney, Agent, or Firm—Melvin R. Stidham

[57] ABSTRACT

A vibration sensitive safety valve for gaseous fluids using a sphere of ferrous material as a valve plug, the ball being held in a sensitive condition, suspended above a complementary valve seat, by a permanent magnet. The magnetic attraction is such that a significant tremor will dislodge the ball, allowing it to drop and plug the valve passage. A flat non-magnetic spacer disc on the bottom of the magnet allows some lateral movement of the valve ball in response to harmless vibrations, without releasing the ball to close off the valve. A moveable mass within the ball absorbs the effect of minor vibrations.

5 Claims, 2 Drawing Sheets

EARTHQUAKE SAFETY VALVE

BACKGROUND OF THE INVENTION

This invention is in the field of automatic safety shut-off valves, which are triggered by an earthquake. The natural phenomenon of earthquakes can destroy structures, and the aftermath frequently results in considerable damage by fires, which are fed by uncontrolled fuels spreading from ruptured conduits and overturned appliances.

There are valves of many types that respond to horizontal vibration; some are very complex, some require precise leveling, most have no means of manual closing, some have very complex resetting methods, and some are overly sensitive and respond to vibrations of a harmless nature, such as those generated by nearby operations of heavy vehicles and equipment.

OBJECTS OF THE INVENTION

It is a object of this invention to provide a valve for preventing flow of flammable gases into a residential or public building gas line, immediately upon occurrence of a dangerous seismic shock.

It is another object of this invention to provide a valve that will close in response to abnormally high vibrations, but not to harmless vibrations from proximate sources.

It is a further object of this invention to provide an earthquake safety valve that may be easily reset without tools or partial disassembly.

It is another object of this invention to provide a safety valve of rugged and simple construction, with a minimum number of moving parts for maximum reliability.

It is still another object of this invention to provide a conduit mounted valve that does not require precise leveling.

Other objects and advantages of this invention will become apparent from the following description, particularly when read in conjunction with the accompanying drawing.

SUMMARY OF THE INVENTION

This invention relates to a normally open, vibration sensitive valve, comprising a valve body wherein a movable valve element is positioned for operation by an axially movable cylindrical magnet. Movement of the magnet is guided by a gland in the upper valve body, which is coaxial with an annular valve seat in the lower valve body. The magnet is moved axially by pressing a manual reset button on a protruding end of the magnet and is retracted by an arming spring to limits imposed by a snap ring and a spacer, bearing against the upper valve body. Downward axial movement of the cylindrical magnet, causing it to engage the previously seated ball element, will magnetically attract the ball so that, when the reset button is released, the arming spring will retract the magnet and lift the valve ball, suspending it in its armed position above the valve seat. A spacer member in this safety valve enables the valve ball to roll horizontally in its elevated, set position without shutting off gas flow in response to minor, harmless vibrations, as may be generated by nearby machinery or vehicles.

DETAILED DESCRIPTION OF PREFERRED EMBODIMENTS

Figure 1:
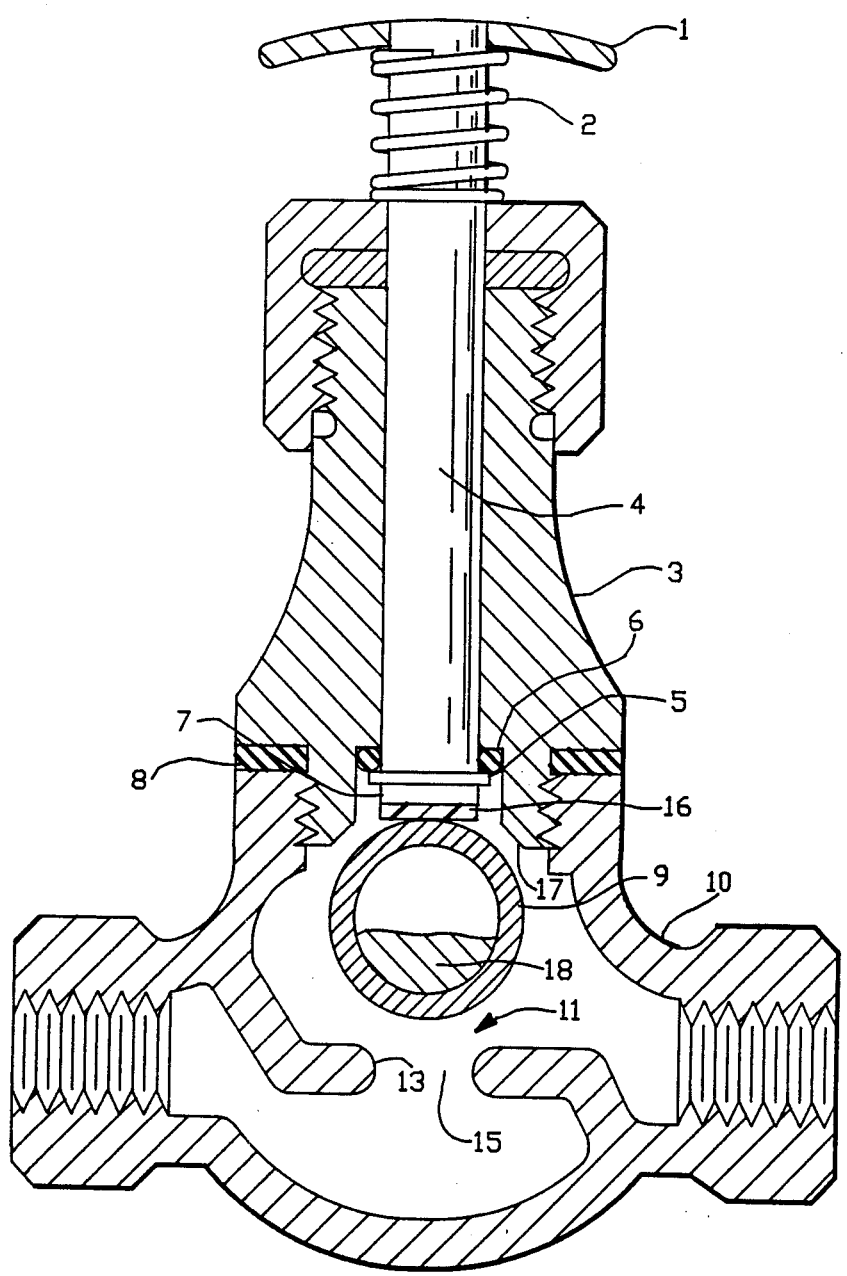
FIG. 1 is a vertical section view of a valve embodying features of this invention.

The Embodiment of FIG. 1

Referring more particularly to FIG. 1 of the drawing the valve body comprises an upper segment 3, which is severable from the lower body 10 for purposes of assembly of internal parts. Both valve body components 3 and 10 are of a nonmagnetic material, such as brass or a suitable rigid plastic. The valve ball 9 is of a ferrous material and the annular space 11 between the ball 9 and a complementary annular seat 13 forms a venturi restriction, which is preferably contoured for smooth flow. This restriction may be set by means of a spacer gasket 8. This spacing affects the venturi attraction of valve ball 9 so that flow in excess of normal will result in a pressure drop, as in the case of a line break, that will trigger the valve to its closed mode. The actuator button 1, which is carried on the valve stem/magnet 4, serves to retain the arming spring 2, as well as to actuate the magnet 4.

In FIG. 1, the valve element or ball 9 is shown in its armed condition with the magnet 4 being held retracted by the arming spring 2. This creates and sets a gap 7 between the permanent magnet 4 and the back-seated valve ball 9, thereby establishing a precise and sensitive magnetic attraction between the magnet 4 and the ball valve element 9. The level of magnetic attraction should be such that it will be overcome by a seismic shock, as well as by a substantial pressure drop across the venturi gap 11, as above described. When this magnetic attraction is so overcome, the valve ball 9 will be released from the armed position shown to drop down and lodge in the seat 13, blocking further flow through the port 15.

The elevated position of the valve stem-magnet 4, and hence, the magnetic sensitivity, is initially determined by selection of a spacer, such as an O-ring 6, which is engaged by a stop collar or shoulder 5. Then, the gap between the magnet 4 and the valve ball 9 is set by bonding or otherwise securing to the bottom of the magnet 4 a suitable spacer disc 16 of a plastic or other non-magnetic material. This disc fixes the size of the gap between the cylindrical magnet 4 and the magnetically attracted valve ball 9 to establish the magnitude of the magnetic attraction between them. In the event of harmless vibrations, particularly of a horizontal nature, the separation disc 16 will enable the valve ball 9 to roll along the separator disc 16 without dropping to the valve seat 13 and shutting off flow.

In addition such vibrations may be largely absorbed by movement of a quantity of heavy liquid, such as mercury 18, contained within the valve ball 9. Such vibrations may cause the mercury to "ripple" or move about inside the ball 9, without causing the ball to drop from its suspended position. Low frequency vibrations on the other hand, may cause considerable displacement of the fluid 18 to dislodge the ball 9 when it strikes the shoulder 17.

Figure 2:
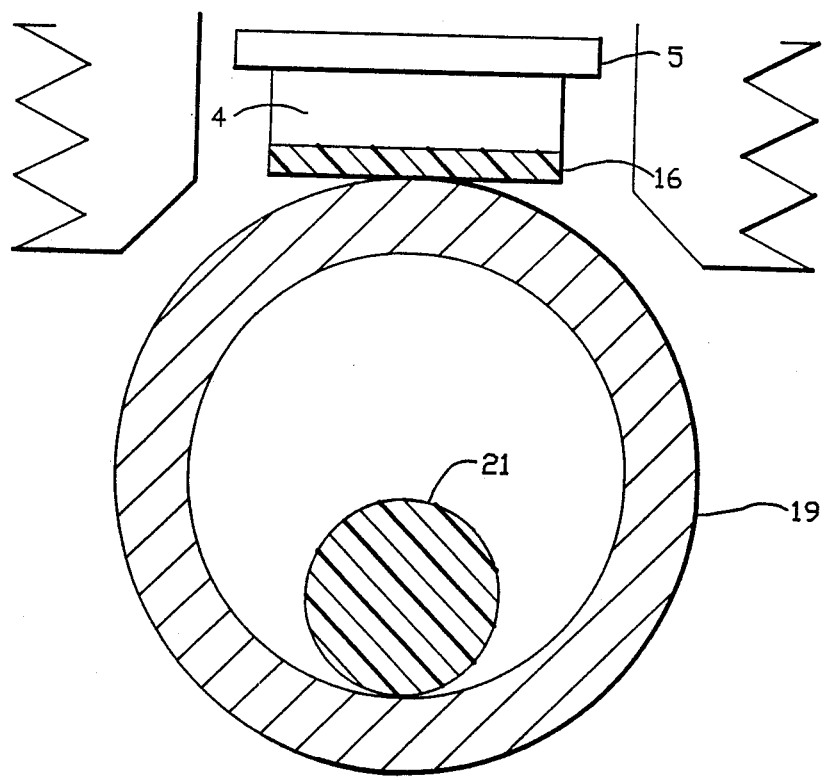
FIG. 2 is an enlarged partial section view of another embodiment of this invention.

The Embodiment of FIG. 2

In this embodiment the ball 19 is again hollow, but contained within it, is a smaller ball of non-magnetic material to roll about and absorb minor, harmless vibrations.

While this invention has been described in conjunction with preferred embodiments thereof, it is obvious that modifications and changes therein may be made by those skilled in the art to which it pertains without depicting from the spirit and scope of this invention, as defined by the claims appended hereto.

What is claimed as invention is:

1. A shock sensitive self-closing safety valve for a gas pipeline comprising:
    a valve body of a non-magnetic material having inlet and outlet flow passageways with an annular, generally horizontal valve seat between them;
    a valve element of a magnetic material above said valve seat;
    a permanent magnet in the shape of a valve stem in said valve body above said valve element and movable therein toward and away from said valve element to engage and suspend same above said valve seat;
    spring means biasing said magnet away from said valve element; and
    a spacer gap of a non-magnetic material secured to the bottom of said magnet to establish the magnetic gap between said magnet and said valve element with said valve element to enable horizontal movement of said valve element while suspended by said magnet.

2. The safety valve defined by claim 1 wherein:
the magnetic gap may be set so that said valve element may be dislodged by a pressure drop below it resulting from an excessive rate of flow below it.

3. The safety valve defined by claim 1 wherein:
said valve element is hollow;
and including:
a mass of material moveably carried in said valve element.

4. The safety valve defined by claim 3 wherein:
said material is a heavy fluid.

5. The safety valve defined by claim 3 wherein:
said mass is a ball.

* * * * *